Figure 1:
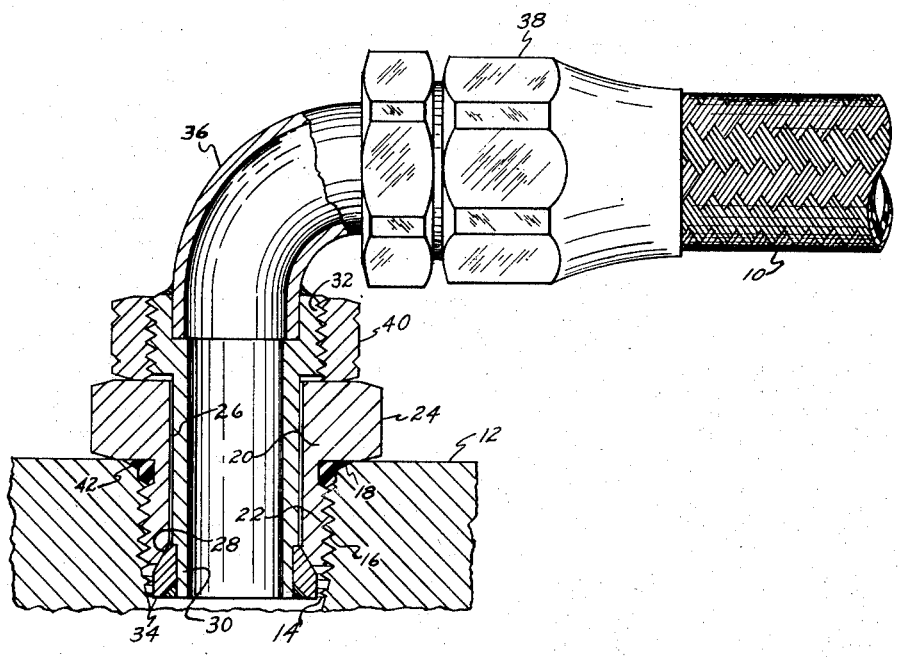

March 1, 1960 R. R. LA MARRE 2,926,935
ADJUSTABLE BOSS FITTING
Filed March 26, 1957

INVENTOR
Roger R. LaMarre
BY Lauren P. Beaman
ATTORNEY

2,926,935
ADJUSTABLE BOSS FITTING

Roger R. La Marre, Jackson, Mich., assignor to Aeroquip Corporation, Jackson, Mich., a corporation of Michigan Application March 26, 1957, Serial No. 648,628

2 Claims. (Cl. 285—184)

The invention relates to an adjustable boss fitting, particularly to a fitting which may be adjustably positioned a full 360°.

In the art of pipe fitting the use of the elbowed boss fitting is common and well known and many types of elbowed fittings have been developed to serve particular applications. Inasmuch as economy necessitates the need for a universal fitting which may be used with various size parts and is readily adjustable as to the position of the elbow, several types of fittings have been developed which permit the elbow to be selectively positioned in the supporting structure while maintaining a fluid tight connection. However, the fittings now available are not capable of easy installation in the cramped quarters found on aircraft, marine and other applications where a premium is placed on compactness, weight and versatility. In many applications, the fitting is placed adjacent an obstruction preventing complete rotation of the elbow as the fitting is screwed into the boss. Other applications require that the "drop-height" be low, i.e. the distance from the face of the boss to the centerline of the hose or pipe connected to the fitting, and aircraft usage, especially, demands that the fitting be as versatile, compact and lightweight as possible capable of a full 360° positional rotation of the elbow without affecting the sealing between the boss and fitting.

It is thus an object of the invention to produce an adjustable boss fitting of a very compact nature which is capable of being threaded into the boss without rotating the entire elbow.

A further object of the invention is to design an adjustable boss fitting which maintains a low "drop-height" yet permits the elbow to be positioned a full 360° without affecting the efficiency of the connection between boss and fitting.

Yet another object of the invention is to produce an elbowed boss fitting in which positioning of the elbow does not cause wear of a sealing ring and which may be assembled and disassembled many times without affecting the efficiency of the sealing ring.

It is another object of the invention to design an adjustable boss fitting which is light weight, compact, may be economically produced and may be rigidly mechanically locked in position.

Yet another object of the invention is to design an adjustable boss fitting which may be readily installed by an inexperienced person and does not require precise positioning of sealing rings and mating elements.

These and other objects of the invention will become apparent when viewed with regard to the accompanying description and drawings wherein the figure discloses a cross-sectional elevation of one embodiment of the invention.

In the disclosed embodiment, the invention is shown forming the connection between a hose or conduit 10 and a supporting member 12. The member 12 is formed with a port 14 which is threaded as at 16 and countersunk at 18 for a purpose later described.

The fitting is attached to member 12 by means of adapter 20 which is of a tubular configuration and is formed with external threads 22 at one end and wrench engaging portion 24 at the other end. The adapter 20 is bored at 26 and the lower extremity of bore 26 is beveled to form a seat 28.

The structure directly supporting the elbow consists of the swivel nipple 30 which extends through the bore 26 of adaptor 20. As seen in the figure the nipple 30 is provided with threads 32 and a conical flange 34 which is welded or brazed to the main body of the nipple 30. The flange 34 is adapted to engage seat 28 while the elbow 36 is welded or brazed to the upper portion of the swivel nipple, as will be noted. The elbow 36 is also welded to the coupling 38 of conduit 10 completing the connection.

Rotative adjustment of elbow 36 is facilitated through the action of the lock nut 40 which cooperates with threads 32 and bears upon the top of adapter 20. It will, thus, be apparent that by rotating nut 40 the flange 34 may be drawn into contact with seat 28.

To prevent leakage between the adapter 20 and member 12 a resilient sealing ring 42 is located in the countersunk portion 18 and compressed by the portion 24.

The operation of the fitting is simple and easily accomplished as is hereinafter described. The fitting is preassembled as shown and is used as a unit, standard thread and elbow sizes are made available as with common pipe elbows, and once the proper fitting is selected the installer need merely place the sealing ring 42 on adapter 20 and screw the adapter into the member 12 until the portion 24 engages the surface of element 12. At this time the seal 42 will be fully compressed in countersink 18 forming an effective sealing action should fluid or air escape past the mating threads 16 and 22.

Once the adapter 20 is firmly tightened in place the elbow 36 may be positioned as desired. By loosening the nut 40 the elbow 36 and swivel nipple 30 may be easily rotated within adapter 20. When proper position is achieved the elbow will be firmly locked in place by tightening nut 40 which will draw the flange 34 into fluid and air tight engagement with the mating seat 28 preventing further rotation of nipple 30 in elbow 36 and forming a fluid tight connection between adapter 20 and nipple 30.

By using separate elements for the threaded portions of the fitting it is possible to utilize the minimum amount of material necessary to provide the desired strength, thus, the weight of the fitting may be kept at a minimum and yet provide adequate strength. The construction of the fitting of the invention also permits a low drop-height without sacrificing versatility, strength or efficiency of sealing action.

It will be apparent that the use of the swivel nipple 30 permits the position of elbow 36 to be easily adjusted a full 360° without causing wear of soft sealing rings yet maintains an effective seal over a long period of time as the wear between flange 34 and seat 28 is negligible when nut 40 is loosened, as is necessary during elbow adjustment.

The placement of seating ring 42 is not critical as the ring is merely slipped over threads 22 into engagement with portion 24 and upon tightening adapter 20 the ring 42 is automatically compressed and located within countersink 18 eliminating any need for critically positioning the sealing ring.

It will, thus, be apparent that the invention discloses a boss fitting which is fully adjustable, compact, light weight, long wearing and readily adaptable to a variety

Having thus described my invention what I claim and wish to protect by Letters Patent is:

1. A boss fitting elbow assembly adapted to be affixed within a threaded hole of a supporting member comprising a tubular adapter having an externally threaded end portion for connecting with the hole of the supporting member, a wrench engageable head formed on the other end of said adapter having an inner bearing surface for engagement with the supporting member and an annular sealing ring adapted to be compressed between a portion of said surface and the supporting member, an axial bore within said adapter and a conical seat within said bore concentric thereto and intersecting the threaded end of said adapter, a tubular nipple within said adapter bore having an enlarged externally threaded end portion of greater diameter than said bore, an annular flange of greater diameter than said adapter bore affixed to the other end of said nipple having a conical surface adapted to sealingly engage the seat within said adapter, a tubular elbow affixed to the enlarged end of said nipple in communication with the bore thereof and a lock nut engaging the threads of the enlarged portion of said nipple adapted to bear on the wrench engaging head of said adapter to draw said flange into engagement with said seat.

2. A boss fitting elbow assembly adapted to be affixed within a threaded hole of a supporting member comprising a tubular adapter having an exteriorly threaded end portion for screw thread connection with the hole of the supporting member, a wrench engageable head formed on the other end of said adapter having inner and outer bearing surfaces, an axial bore within said adapter and a conical seat formed within said bore concentric thereto and intersecting the threaded end of said adapter, a tubular nipple within said adapter bore having an enlarged exteriorly threaded outer end portion of greater diameter than said bore, an annular flange of greater diameter than said adapter bore affixed to the inner end of said nipple having a conical surface adapted to sealingly engage the seat within said adapter, a tubular elbow affixed to the outer end of said nipple in communication with the bore thereof, and a lock nut engaging the threads of the enlarged portion of said nipple whereby said adapted is threaded in the hole of the supporting member until said inner bearing surface sealingly engages the support member whereupon said flange is drawn into engagement with said seat upon rotation of said locking nut and the engagement thereof with said outer bearing surface.

References Cited in the file of this patent

UNITED STATES PATENTS

| | | |
|---|---|---|
| 409,288 | Jackson | Aug. 20, 1889 |
| 620,807 | Smith | Mar. 7, 1899 |
| 662,592 | Burger | Nov. 27, 1900 |
| 788,172 | Seiler | Apr. 25, 1905 |
| 947,711 | Costa | Jan. 25, 1910 |
| 961,170 | Shotwell | June 14, 1910 |
| 2,342,425 | Parker | Feb. 22, 1944 |
| 2,481,404 | Donner | Sept. 6, 1949 |
| 2,799,521 | Knapp | July 16, 1957 |

FOREIGN PATENTS

| | | |
|---|---|---|
| 730,582 | France | May 17, 1932 |